US006830058B2

(12) United States Patent
Li

(10) Patent No.: US 6,830,058 B2
(45) Date of Patent: Dec. 14, 2004

(54) SOLAR LIGHTING SYSTEM FOR OUTDOORS UMBRELLA

(76) Inventor: Wanda Ying Li, 121 E. Alton, Santa Ana, CA (US) 92707

( * ) Notice: Subject to any disclaimer, the term of this patent is extended or adjusted under 35 U.S.C. 154(b) by 11 days.

(21) Appl. No.: 10/436,192

(22) Filed: May 12, 2003

(65) Prior Publication Data

US 2004/0226598 A1 Nov. 18, 2004

(51) Int. Cl.$^7$ .............................. A45B 3/00; A45B 23/00
(52) U.S. Cl. ........................... 135/16; 135/910; 362/102
(58) Field of Search ............................. 135/16, 98, 910; 362/102

(56) References Cited

U.S. PATENT DOCUMENTS 6,017,188 A * 1/2000 Benton .......................... 416/5
6,298,866 B1 * 10/2001 Molnar, IV .................. 135/16
6,692,135 B2 * 2/2004 Li .............................. 362/102

FOREIGN PATENT DOCUMENTS

WO   WO 90/00840   * 1/1993   ........... A45B/23/00

* cited by examiner

Primary Examiner—Robert Canfield
(74) Attorney, Agent, or Firm—Raymond Y. Chan; David and Raymond Patent Group

(57) ABSTRACT

A solar lighting system, which is incorporated with an outdoors umbrella, includes a solar energy collector mounted on top of the outdoors umbrella, a light support, which is adjustably mounted along a supporting shaft of the outdoors umbrella at a position within the shadowing area of the awning frame, including a plurality of supporting arms radially extended from the supporting shaft, and a plurality of illuminators connecting to the supporting arms respectively in a movably suspended manner such that by selectively adjusting a position of the light support along the supporting shaft, the illuminators are suspendedly self-repositioned for maximizing a light coverage area within the shadowing area.

20 Claims, 5 Drawing Sheets

SOLAR LIGHTING SYSTEM FOR OUTDOORS UMBRELLA

BACKGROUND OF THE PRESENT INVENTION

1. Field of Invention

The present invention relates to an outdoors umbrella, and more particularly to an outdoors umbrella incorporated with a solar lighting system securely for providing illumination by utilizing solar energy.

2. Description of Related Arts

Outdoors umbrellas have been proved to be extremely popular among those frequently expose to outdoor environment. In the daytime, a typical outdoor umbrella may be utilized as a temporary shelter so that people or instruments under the umbrella are protected from high temperature or vigorous sunlight. Moreover, depending on the material by which the umbrella fabric is fabricated, even in cloudy or rainy weather, the outdoors umbrella may be utilized as a rain shelter or wind shelter. On the other hand, the typical outdoors umbrella is adapted to incorporate with a lighting system wherein a plurality of illuminating units are mounted on the awning ribs for providing a predetermined degree of illumination to a lighting zone defined as the area under the umbrella fabric. Therefore, people may utilize the outdoors umbrella with the lighting system in a variety of outdoors activities during nighttime, such as barbecuing, camping, outdoors gathering, or other events which involve considerable outdoors exposure at night.

The very advantage and convenience of the typical outdoors umbrella, however, do not shelter its disadvantages. It is the feature that the umbrella is capable of being utilized as a light source in an outdoors environment that renders its desirability to locate close to an external power source. Yet in an outdoors environment, the external power source, at least in the sense of the most typical power source for lighting system—electrical power source, cannot be guaranteed. One might utilize a rechargeable battery as the power source, but an additional step of charging the battery is inevitably needed. Very often, charging the battery can only be taken place when the umbrella is idle. Therefore, for example, when the user of the umbrella forgets charging the battery, the lighting system would not work on the next day. Sometimes, where the rechargeable battery cannot be conveniently detached from the outdoors umbrella, charging the battery would mean allocating extra space to store or to place the outdoor umbrella while the battery is being recharged.

The mounting arrangement of most of the outdoors umbrellas represents another problem. A considerable numbers of outdoors umbrellas have their lighting system mounted insecurely or in such a manner that the lighting system is functionally incompatible with the normal operation of the outdoor umbrellas themselves. As result, the performance of the respective lighting system is far from satisfactory. For example, during folding and unfolding operations of the outdoors umbrella, the awning ribs thereof may accidentally destroy the illuminating units of the lighting system. Since such outdoors umbrellas are designed for use in outdoors environment, as a result secure mounting of the illuminating units are of utmost importance. If the lighting system is so insecure that, when subject to certain outdoors phenomenon, such as against a sudden strong wind, the lighting system is incapable of safely or unstably operating, it would not only cause disruption to the activities in which it uses, but also harm to the users, especially those standing or sitting within the lighting zone.

Last but not least, the typical lighting system of the outdoors umbrellas tend to be immovable in the sense that the illuminating units are permanently affixed on the awning ribs so that the illuminating directions are limited by the orientation and movement of the awning ribs. As a result, where the outdoors umbrella needs to be inclinedly supported on the ground in order to shield a particular direction, or partially opened for a particular purpose, the lighting system could not be satisfactorily operated.

SUMMARY OF THE PRESENT INVENTION

A main object of the present invention is to provide an outdoors umbrella which incorporates with a solar lighting system for providing illumination utilizing solar energy as an external energy source. Thus, the solar lighting system is environmentally friendly and economical to operate.

Another object of the present invention is to provide an outdoors umbrella with a solar lighting system, wherein the electrical operation of the solar light system is substantially unaffected by the folding and unfolding operation of the outdoors umbrella so that it is capable of fully operating while the outdoors umbrella is partially or inclinedly erected.

Another object of the present invention is to provide an outdoors umbrella with a solar lighting system which does not alter the original structural design of the outdoors umbrella, so as to minimize any potential risk of damage to the solar lighting system while the outdoor umbrella is folding or unfolding.

Another object of the present invention is to provide an outdoors umbrella with a solar lighting system which is capable of collecting solar energy while being exposed to sunlight to convert into electrical energy for recharging a power source to the illuminating units whenever necessary.

Another object of the present invention is to provide an outdoors umbrella comprising a solar lighting system, wherein no complicated mechanical and electrical structure and mechanism is required to incorporate with the outdoors umbrella so as to minimize the manufacturing and related cost of the present invention.

In order to accomplish the above objects, the present invention provide an outdoors umbrella, comprising:

an awning frame defining a shadowing area thereunder;

a supporting frame comprising a supporting shaft having an upper portion connected to the awning frame; and a solar lighting system, comprising:

a solar energy collector mounted on top of the awning frame for collecting solar energy;

a light support, which is adjustably mounted along the supporting shaft at a position within the shadowing area of the awning frame, comprising a plurality of supporting arms radially extended from the supporting shaft; and a plurality of illuminating units each comprising an illuminator electrically connected to the solar energy collector through the awning frame and a coupling joint connecting the illuminator to the respective supporting arm in a movably suspended manner such that by selectively adjusting a position of the light support along the supporting shaft, the illuminators are suspendedly self-repositioned for maximizing a light coverage area within the shadowing area.

These and other objectives, features, and advantages of the present invention will become apparent from the fol-

DETAILED DESCRIPTION OF THE PREFERRED EMBODIMENT

Figure 1:
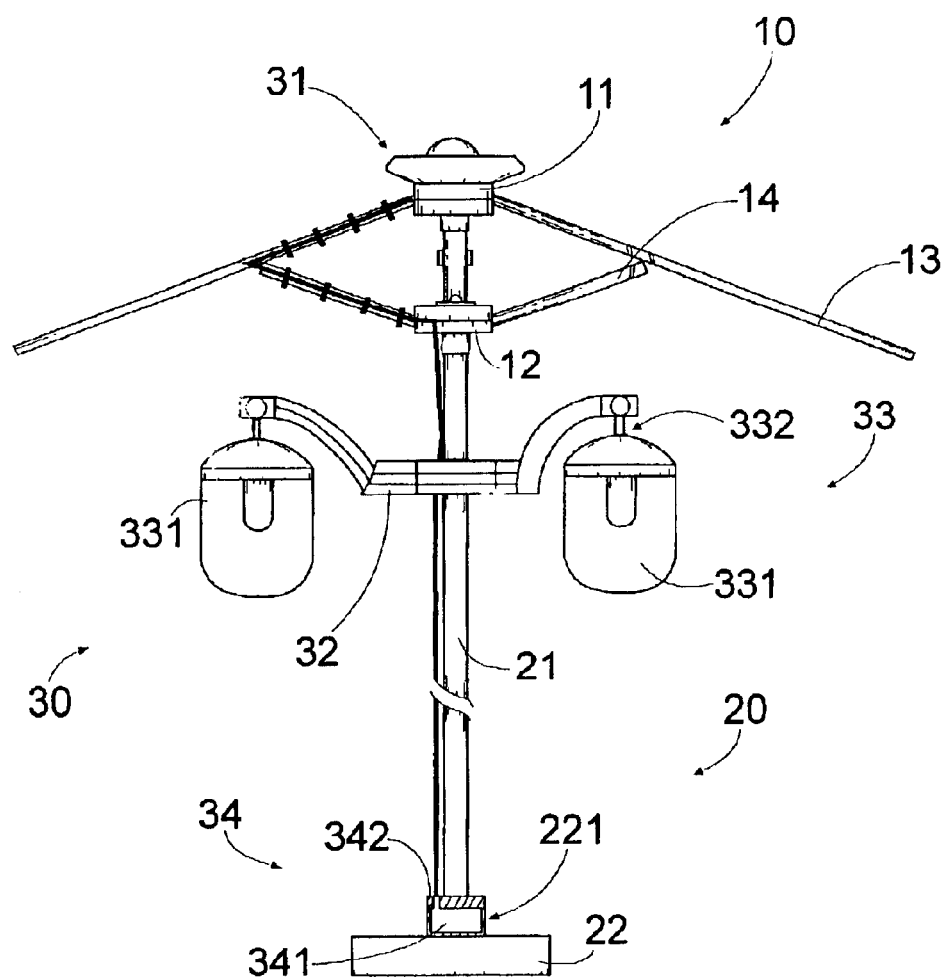
FIG. 1 is a schematic diagram of an outdoors umbrella incorporated with a solar lighting system according to a preferred embodiment of the present invention.

Referring to FIG. 1 of the drawings, an outdoor umbrella 1 according to a preferred embodiment of the present invention is illustrated, wherein the outdoor umbrella 1, such as a conventional outdoor umbrella, comprises an awning frame 10 defining a shadowing area 101 thereunder and a supporting frame 20 comprising a supporting shaft 21 having an upper portion connected to the awning frame 10.

The outdoor umbrella 1 further comprises a solar lighting system 30 comprising a solar energy collector 31 mounted on top of the awning frame 10 for collecting solar energy, a light support 32, and a plurality of illuminating units 33. The light support 32, which is adjustably mounted along the supporting shaft 21 at a position within the shadowing area 101 of the awning frame 10, comprises a plurality of supporting arms 321 radially extended from the supporting shaft 21.

Each of illuminating units 33 comprises an illuminator 331 electrically connected to the solar energy collector 31 through the awning frame 10 and a coupling joint 332 connecting the illuminator 331 to the respective supporting arm 321 in a movably suspended manner such that by selectively adjusting a position of the light support 32 along the supporting shaft 21, the illuminators 331 are suspendedly self-repositioned for maximizing a light coverage area within the shadowing area 101.

According to the preferred embodiment, the awning frame 10 comprises an upper housing 11 affixed on top of the supporting shaft 21, a lower housing 12 slidably connected to the supporting shaft 21 at a position below the upper housing 11, a plurality of awning arms 13 radially and pivotally extended from the upper housing 11 to support an awning shelter 15 thereon, and a plurality of awning ribs 14 pivotally connecting the lower housing 12 with the awing arms 13 respectively in such a manner that when the lower housing 12 is slid along the supporting shaft 21 towards the upper housing 11, the awning arms 13 are pivotally driven by the awning ribs 14 to radially extended from the upper housing 11 so as to provide the shadowing area 101 under the awning shelter 15.

The supporting frame 20 further comprises a ground stand 22 wherein the supporting shaft 21 is upwardly extended from the ground stand 22 to support the awning frame 10.

Figure 2:
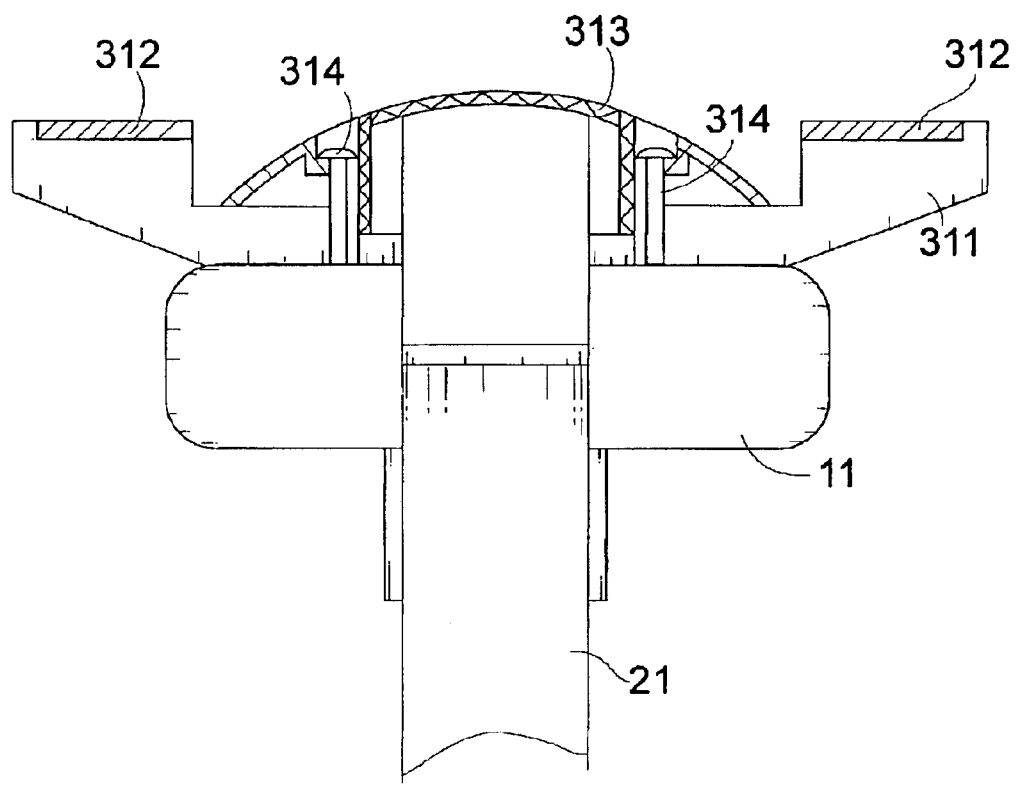
FIG. 2 is a sectional view of the solar lighting system of the outdoors umbrella according to the above preferred embodiment of the present invention, illustrating the solar energy collector of the solar lighting system.

Referring to FIG. 2, the solar energy collector 31 comprises a collector base 311, having a circular shaped, coaxially mounted on a top end portion of the supporting shaft 21 at a position above the upper housing 11, and a solar energy collecting device 312 which is provided on a platform of the collector base 311 and is upwardly oriented for collecting the solar energy so as to convert the solar energy into electrical energy to the illuminators 331.

In order to further secure the attachment between the solar energy collector 31 and the supporting shaft 21, the solar energy collector 31 further comprises a protective cover 313 substantially affixed to the upper housing 11 on top of the supporting shaft 21 so as to securely sandwich the collector base 311 between the upper housing 11 and the protective cover 313. As shown in FIG. 2, in order to facilitate the secure attachment, two connecting elements 314, which are preferably two rivets, can be utilized to mount the protective cover 313 to the upper housing 11 through the upper housing 11 to securely clamp the collector base 311 between the upper housing 11 and the protective cover 313, so as to retain the solar energy collecting device 312 in position.

Figure 3:
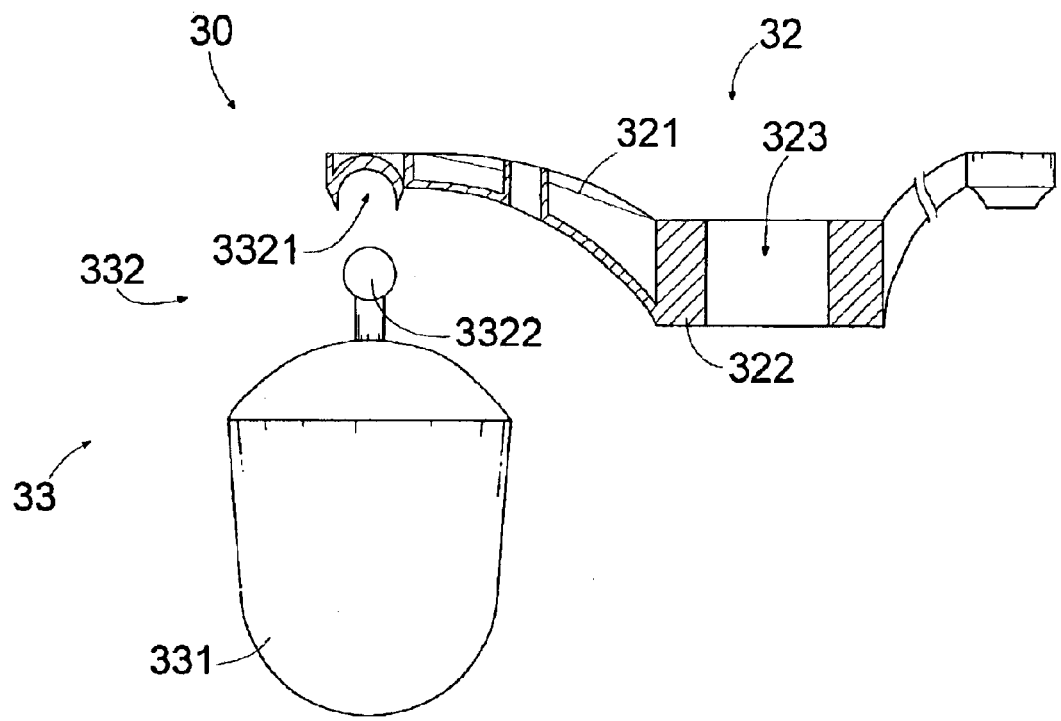
FIG. 3 is a partially sectional view of the lighting system of the outdoors umbrella according to the above preferred embodiment of the present invention, illustrating the illuminating unit of the solar lighting system.

As shown in FIG. 3, the light support 32 further comprises a central hub 322 having a central sliding through slot 323 for the supporting shaft 21 sliding therethrough, wherein the supporting arms 31 are spacedly and radially extended from the central hub 322.

Each of the illuminators 331 is embodied as a light bulb wherein the illuminators 331 are electrically connected to the solar energy collecting device 312 of the solar energy collector 31 along one of the awning arms 13 and the respective awning rib 14 via an electric cable, as shown in FIG. 1, in such a manner that the electrical connection between the illuminators 331 and the solar energy collector 31 will not be interfered by the awning frame 10, especially the folding and unfolding operation of the awning frame 10 of the outdoor umbrella 1. Accordingly, the awning arms 13 and the awning ribs 14 are constructed to have a hollow shape such that the electric cable is adapted to pass through the respective awning arm 13 and the awning rib 14 to electrically connect the solar energy collector 31 to the respective illuminator 331.

It is worth to mention that each illuminator 331 is preferably embodied as a Light Emitting Diode (LED) received in a light housing since the LED of the illuminator 331 provides a predetermined set of illumination parameters, such as brightness, color etc. so as to provide optimal illumination for a range of designated applications while being energy effective.

Each of the coupling joints 332 has a ball slot 3321 formed at a distal end of the respective supporting arm 321 and comprises a spherical head 3322 which is formed on top of the respective illuminator 331 and is arranged to engage with the respective ball slot 3321 in a rotatably movable manner, so as to provide a ball joint to connect the each of the illuminators 331 with the respective supporting arm 321. In other words, the illuminators 331 are capable of self-rotating while being suspendedly supported by the supporting arms 321 so as to enhance the flexibility of the provision of illumination to the outdoors umbrella 1.

It is worth to mention that a size of the spherical head 3322 is slightly smaller than the size of the respective ball slot 3321 wherein an outer wall of the ball slot 3321 is fabricated by elastic materials, such as plastic, so that by slightly pressing the spherical head 3322 to the respective ball slot 3321, the spherical head 3322 is capable of moving within the respective ball slot 3321 in free-swinging manner.

According to the preferred embodiment, there are three supporting arms 321 radially and suspendedly extended from the central hub 322 wherein there are three illuminators 331 are suspendedly supported by the supporting arms 321 via the coupling joints 332 respectively.

Figure 4:
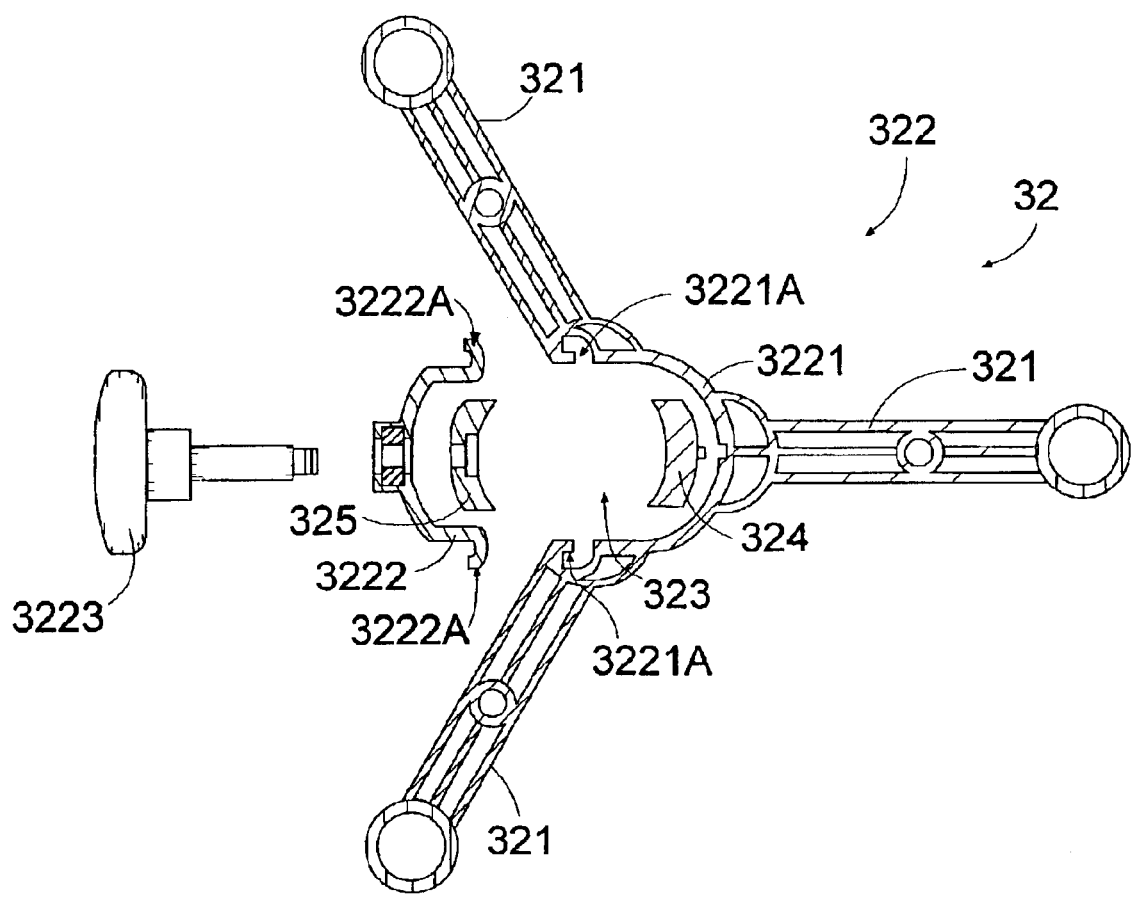
FIG. 4 is an exploded sectional view of the light support of the solar lighting system according to the above preferred embodiment of the present invention.
Figure 5:
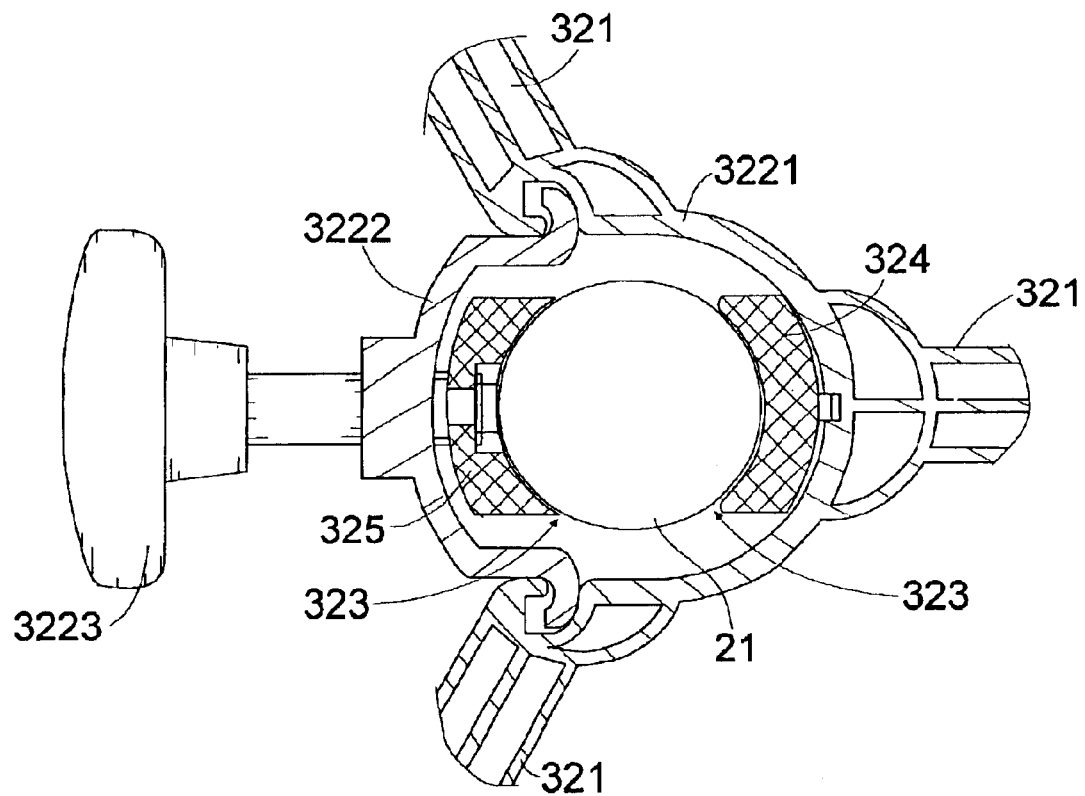
FIG. 5 is a partially sectional view of the light support of the solar lighting system according to the above preferred embodiment of the present invention, illustrating the light support being mounted on the supporting shaft.

Referring to FIGS. 4 to 5 of the drawings, the central hub 322 comprises a boundary sleeve 3221 having an arc-shaped and a boundary cover 3222 interlocked with the boundary sleeve 3221 to form the central sliding through slot 323 within inner walls of the boundary sleeve 3221 and the boundary cover 3222, and a locking member 3223 having a locking end rotatably penetrated through the boundary cover 3222 to bias against the supporting shaft 21 so as to lock up the central hub 322 at the supporting shaft 21 in position.

As shown in FIG. 4 of the drawings, the boundary sleeve 3221 has two locking grooves 3221A formed along two edge portions and the boundary cover 3222 has two locking edges 3222A, each having a hook shaped corresponding to the locking groove 3221A, fittedly engaged with the locking grooves 3221A so as to interlock the boundary cover 3222 with the boundary sleeve 3221. Therefore, when the boundary cover 3222 is interlocked with the boundary sleeve 3221 to retain the supporting shaft 21 within the central sliding through slot 323, the locking member 3223 is rotated through the boundary cover 3222 until the locking end of the locking member 3223 is driven to bias against the supporting shaft 21 to lock up the light support 32 on the supporting shaft 21.

The light support 32 further comprises a first securing member 324 detachably attached to the inner wall of the boundary sleeve 3221 to bias against the supporting shaft 21 and a second securing member 325 attached to the locking end of the locking member 3223 at the inner wall of the boundary cover 3222 wherein the second securing member 325 is driven by the locking member 3223 to adjust a size of the central sliding through slot 323 for fittingly biasing against the supporting shaft 21 such that the supporting shaft 21 is securely clamped between the first and second securing members 324, 325. In other words, the light support 32 is capable of fittingly mounting on different sizes of the supporting shafts having various diameters by selectively adjusting a distance between the first and second securing members 324, 325.

As shown in FIG. 1, the solar lighting system 30 further comprises a power source unit 34 which comprises a power source 341 supported by the supporting frame 20 to receive in a power source compartment 221 provided at the ground stand 22 and to electrically connect with the illuminating units 33 and an recharging device 342 electrically connecting the solar energy collector 31 with the power source 341 for converting the solar energy into the electrical energy so as to recharge the power source 341. Accordingly, during the daytime, the solar energy collector 31 collects the solar energy and charges up the power source 341 via the recharging device 342 such that the power source 341 is capable of providing electrical energy to the illumination units 33 during the nighttime. It is worth to mention that the recharging device 342 functions as an auto switch to automatically recharging the power source 341. Therefore, the recharging device 342 is capable of determining an electric capacity of the power source 341 wherein when the electric capacity of the power source 341 is full of charge, the recharging device 342 stops recharging the power source 341. However, when the electric capacity of the power source 341 is below a predetermined level, the recharging device 342 will start recharging the power source 341 from the solar energy collector 31 until the electric capacity of the power source 341 is full of charge.

It is also worth mentioning that from the forgoing elaboration, one can easily see that the solar lighting system 30 is capable of securing mounting onto the supporting shaft 21 of the supporting frame 20 without affecting the operation of the outdoors umbrella 1 as a whole. Moreover, the illuminating units 33 of the solar lighting system 30 are capable of freely orientating so that when the outdoors umbrella 1 occasionally requires inclined erection or open partially, the solar lighting system 30 will always provide optimal illumination, irrespective of such occasions.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. An outdoors umbrella, comprising:

an awning frame defining a shadowing area thereunder;

a supporting frame comprising a supporting shaft having an upper portion connected to said awning frame; and a solar lighting system, comprising:

a solar energy collector mounted on top of said awning frame for collecting solar energy;

a light support, which is adjustably mounted along the supporting shaft at a position within the shadowing area of the awning frame, comprising a central hub having a central sliding through slot for said supporting shaft sliding therethrough, and a plurality of supporting arms radially extended from said central hub; and a plurality of illuminating units each comprising an illuminator electrically connected to said solar energy collector through said awning frame and a coupling joint connecting said illuminator to said respective supporting arm in a movably suspended manner such that by selectively adjusting a position of said light support along said supporting shaft, said illuminators are suspendedly self-repositioned for maximizing a light coverage area within said shadowing area.

2. The outdoors umbrella, as recited in claim 1, wherein said central hub comprises a boundary sleeve having an arc-shaped and a boundary cover interlocked with said boundary sleeve to form said central sliding through slot within inner walls of said boundary sleeve and said boundary cover, and a locking member having a locking end rotatably penetrated through said boundary cover to bias against said supporting shaft so as to lock up said central hub at said supporting shaft in position.

3. The outdoors umbrella, as recited in claim 2, wherein said boundary sleeve has two locking grooves formed along two edge portions and said boundary cover has two locking edges, each having a hook shaped corresponding to said locking groove, fittedly engaged with said locking grooves so as to interlock said boundary cover with said boundary sleeve.

4. The outdoors umbrella, as recited in claim 2, wherein said light support further comprises a first securing member detachably attached to said inner wall of said boundary sleeve to bias against said supporting shaft and a second securing member attached to said locking end of said locking member at said inner wall of said boundary cover, wherein said second securing member is driven by said locking member to substantially bias against said supporting shaft such that said supporting shaft is securely clamped between said first and second securing members.

5. The outdoors umbrella, as recited in claim 3, wherein said light support further comprises a first securing member detachably attached to said inner wall of said boundary sleeve to bias against said supporting shaft and a second securing member attached to said locking end of said locking member at said inner wall of said boundary cover, wherein said second securing member is driven by said locking member to adjust a size of said central sliding through slot for fittingly biasing against said supporting shaft such that said supporting shaft is securely clamped between said first and second securing members.

6. The outdoors umbrella, as recited in claim 1, wherein each of said coupling joints has a ball slot formed at a distal end of said respective supporting arm and comprises a spherical head which is formed on top of said respective illuminator and is arranged to rotatably engage with said respective ball slot in free-swinging manner.

7. The outdoors umbrella, as recited in claim 2, wherein each of said coupling joints has a ball slot formed at a distal end of said respective supporting arm and comprises a spherical head which is formed on top of said respective illuminator and is arranged to rotatably engage with said respective ball slot in free-swinging manner.

8. The outdoors umbrella, as recited in claim 5, wherein each of said coupling joints has a ball slot formed at a distal end of said respective supporting arm and comprises a spherical head which is formed on top of said respective illuminator and is arranged to rotatably engage with said respective ball slot in free-swinging manner.

9. The outdoors umbrella, as recited in claim 1, wherein said solar energy collector comprises a collector base, having a circular shaped, coaxially mounted on a top end portion of said supporting shaft at a position above said awning frame, and a solar energy collecting device which is provided on a platform of said collector base and is upwardly oriented for collecting said solar energy so as to convert said solar energy into electrical energy to said illuminators.

10. The outdoors umbrella, as recited in claim 5, wherein said solar energy collector comprises a collector base, having a circular shaped, coaxially mounted on a top end portion of said supporting shaft at a position above said awning frame, and a solar energy collecting device which is provided on a platform of said collector base and is upwardly oriented for collecting said solar energy so as to convert said solar energy into electrical energy to said illuminators.

11. The outdoors umbrella, as recited in claim 8, wherein said solar energy collector comprises a collector base, having a circular shaped, coaxially mounted on a top end portion of said supporting shaft at a position above said awning frame, and a solar energy collecting device which is provided on a platform of said collector base and is upwardly oriented for collecting said solar energy so as to convert said solar energy into electrical energy to said illuminators.

12. The outdoors umbrella, as recited in claim 9, wherein said solar energy collector further comprises a protective cover substantially affixed to said upper housing on top of said supporting shaft to securely sandwich said collector base between the upper housing and the protective cover, so as to retain said solar energy collecting device in position.

13. The outdoors umbrella, as recited in claim 10, wherein said solar energy collector further comprises a protective cover substantially affixed to said upper housing on top of said supporting shaft to securely sandwich said collector base between the upper housing and the protective cover, so as to retain said solar energy collecting device in position.

14. The outdoors umbrella, as recited in claim 11, wherein said solar energy collector further comprises a protective cover substantially affixed to said upper housing on top of said supporting shaft to securely sandwich said collector base between the upper housing and the protective cover, so as to retain said solar energy collecting device in position.

15. The outdoors umbrella, as recited in claim 1, wherein said awning frame comprises an upper housing affixed on top of said supporting shaft to support said solar energy collector, a lower housing slidably connected to said supporting shaft at a position below said upper housing, a plurality of hollow awning arms radially and pivotally extended from said upper housing to support an awning shelter thereon, and a plurality of hollow awning ribs pivotally connecting said lower housing with said awning arms respectively, wherein said solar energy collector is electrically connected with said illuminators via an electric cable which extended through one of said awning arms and said awning rib.

16. The outdoors umbrella, as recited in claim 8, wherein said awning frame comprises an upper housing affixed on top of said supporting shaft to support said solar energy collector, a lower housing slidably connected to said supporting shaft at a position below said upper housing, a plurality of hollow awning arms radially and pivotally extended from said upper housing to support an awning shelter thereon, and a plurality of hollow awning ribs pivotally connecting said lower housing with said awning arms respectively, wherein said solar energy collector is electrically connected with said illuminators via an electric cable which extended through one of said awning arms and said awning rib.

17. The outdoors umbrella, as recited in claim 14, wherein said awning frame comprises an upper housing affixed on top of said supporting shaft to support said solar energy collector, a lower housing slidably connected to said supporting shaft at a position below said upper housing, a plurality of hollow awning arms radially and pivotally extended from said upper housing to support an awning shelter thereon, and a plurality of hollow awning ribs pivotally connecting said lower housing with said awning arms respectively, wherein said solar energy collector is electrically connected with said illuminators via an electric cable which extended through one of said awning arms and said awning rib.

18. The outdoors umbrella, as recited in claim 1, wherein said solar lighting system further comprises a power source unit which comprises a power source supported by said supporting frame to electrically connect with said illuminating units and an recharging device electrically connecting said solar energy collector with said power source for converting said solar energy into electrical energy so as to recharge said power source.

19. The outdoors umbrella, as recited in claim 11, wherein said solar lighting system further comprises a power source unit which comprises a power source supported by said supporting frame to electrically connect with said illuminating units and an recharging device electrically connecting said solar energy collector with said power source for converting said solar energy into electrical energy so as to recharge said power source.

20. The outdoors umbrella, as recited in claim 17, wherein said solar lighting system further comprises a power source unit which comprises a power source supported by said supporting frame to electrically connect with said illuminating units and an recharging device electrically connecting said solar energy collector with said power source for converting said solar energy into electrical energy so as to recharge said power source.

* * * * *